Feb. 5, 1946. B. H. BROWALL 2,394,038
LOAD-GEAR EQUIPMENT FOR VEHICLE BRAKES
Filed June 12, 1944   3 Sheets-Sheet 1
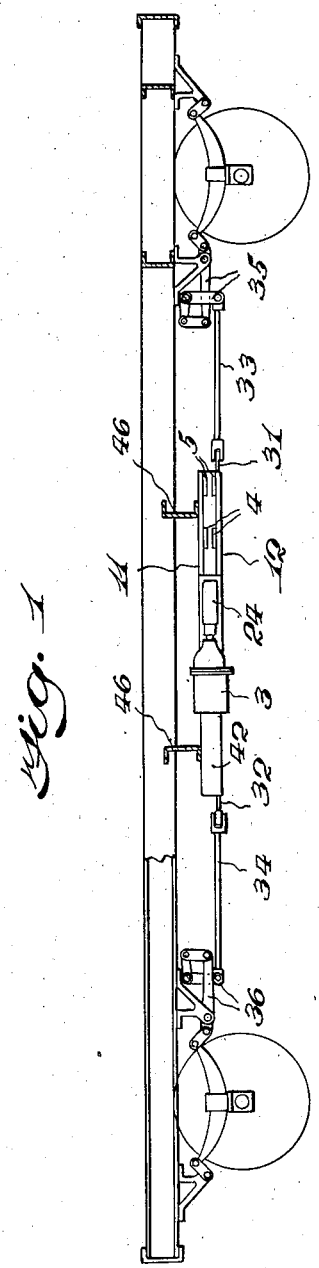
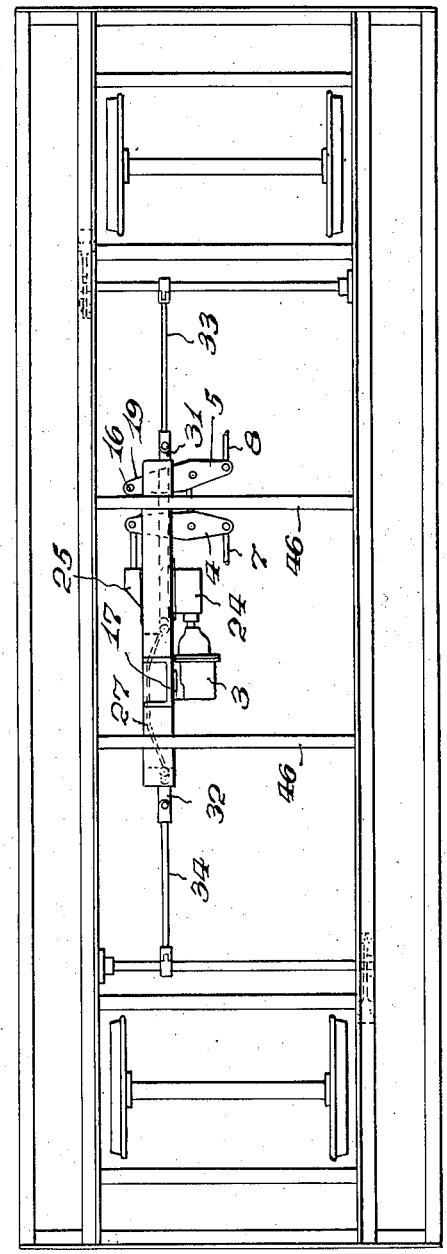
Inventor
Bert Henry Browall, Feb. 5, 1946.　　　B. H. BROWALL　　　2,394,038
LOAD-GEAR EQUIPMENT FOR VEHICLE BRAKES
Filed June 12, 1944　　　3 Sheets-Sheet 2
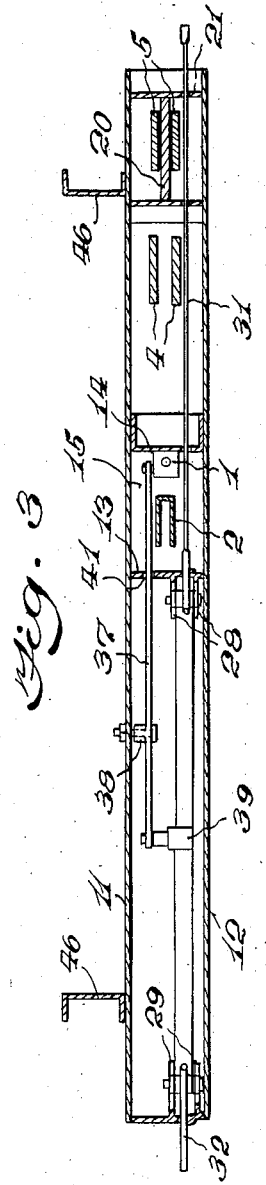
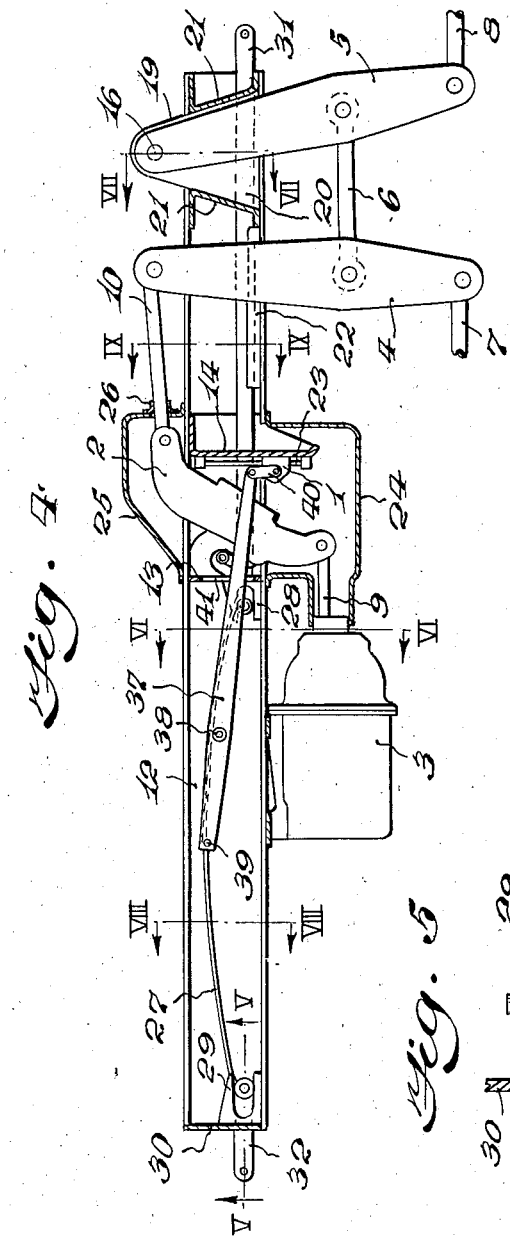
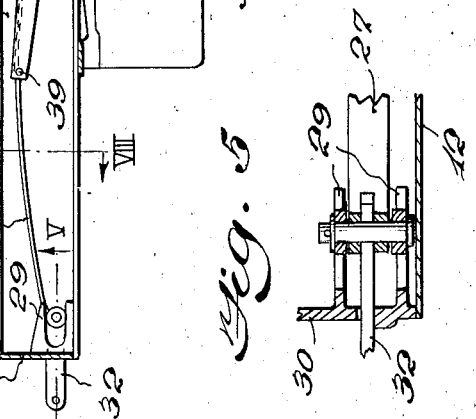
Inventor
Bert Henry Browall,
By E. F. Wendworth
Attorney Feb. 5, 1946. B. H. BROWALL 2,394,038
LOAD-GEAR EQUIPMENT FOR VEHICLE BRAKES
Filed June 12, 1944 3 Sheets-Sheet 3
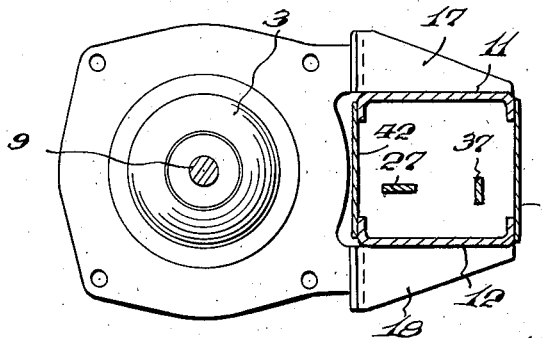
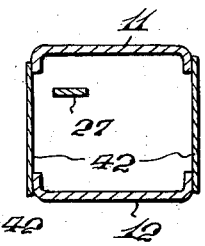
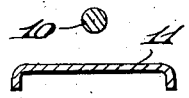
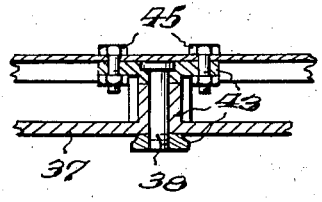
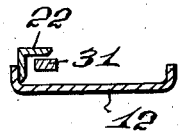
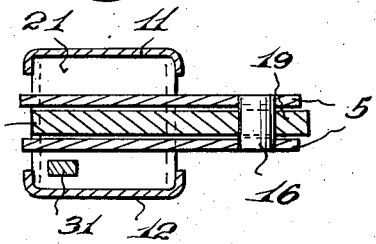
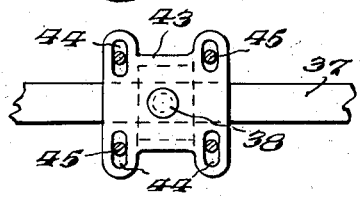
Inventor
Bert Henry Browall, Patented Feb. 5, 1946

2,394,038

UNITED STATES PATENT OFFICE 2,394,038

LOAD-GEAR EQUIPMENT FOR VEHICLE BRAKES

Bert Henry Browall, Malmo, Sweden, assignor to Svenska Aktiebolaget Bromsregulator, Malmo, Sweden, a corporation of Sweden Application June 12, 1944, Serial No. 539,899
In Sweden June 21, 1943

14 Claims. (Cl. 188—195)

This invention refers to such brakes for vehicles, especially railway vehicles, as are provided in their rigging, which connects the braking members (brake shoes) to the source of brake power (brake cylinder), with a so-called load gear for varying the brake applying leverage of the brake rigging for the purpose of suiting the brake pressure on full application of the brakes to the varying load of the vehicle. More particularly the invention refers to vehicle brakes in which the brake rigging is of the conventional type comprising a couple of equalizing brake levers (which according to the nomenclature used in connection with an empty and load brake equipment for freight cars in the well-known Car Builders' Cyclopedia of American Practice, fourteenth edition, 1937, are called the cylinder lever and the floating lever) for distributing the brake power to the opposite ends of the vehicle. To enable the load gear to be constructed in such a manner that it may be fitted as a standard constructional unit or unitary equipment to practically any constructional form whatsoever of the said conventional type of brake rigging, constructions have been suggested in which the load gear comprises an additional brake lever connecting the cylinder lever to the push rod of the brake cylinder and thereby reversing the conventional position of the latter in relation to the cylinder lever, and a shiftable fulcrum for this additional or so-called reversing lever. It has been suggested to attach such a load gear as a constructional unit to the underneath side of the under-frame of the vehicle by means of a common supporting member for the reversing lever and the shiftable fulcrum therefor. It has also been suggested that the said supporting member be given the form of a casing or so-called load-gear box, enclosing the load gear (see U. S. Patent No. 2,204,925). A prerequisite to this, however, is that the load-gear box and the necessary stationary fulcrum for the floating lever be mounted separately on suitable beams of the under-frame of the vehicle. This manner of attachment has, however, many inherent disadvantages; primarily it generally requires the provision of a number of beams, the mounting of which on the under-frames of certain types of vehicles may offer great difficulties, and secondly, on application of the brakes such beams will be subjected to unbound forces subjecting the under-frame of the vehicle to undesired strains.

It is a primary object of the present invention to overcome these difficulties. This and further objects that will become apparent from the following description, are realized by the novel relationship of parts hereinafter described in detail with reference to a preferred embodiment, which for illustrative purposes is shown more or less diagrammatically in the accompanying drawings, in which:

Fig. 1 is a diagrammatical side view, partly in section, of a railway vehicle with a load-gear equipment mounted thereon.

Fig. 2 is a diagrammatic plan view of the under-frame of the vehicle with the load-gear equipment mounted thereon.

Figs. 3 and 4 are vertical and horizontal longitudinal sections, respectively, of the load gear and the beam carrying the load gear, the brake cylinder and the stationary fulcrum for the floating lever of the brake rigging.

Fig. 5 is a vertical detail section taken approximately on the line V—V of Fig. 4.

Fig. 6 is a vertical detail section taken approximately on the line VI—VI of Fig. 4 and showing the mounting of the brake cylinder on one side of the supporting beam.

Fig. 7 is a vertical cross section through the supporting beam approximately on the line VII—VII of Fig. 4, showing the mounting of the stationary fulcrum for the floating lever on the other side of the supporting beam.

Figs. 8 and 9 are cross sections of the supporting beam, taken on the lines VIII—VIII and XI—XI respectively of Fig. 4.

Figs. 10 and 11 are a longitudinal vertical section through a portion of the upper part of the supporting beam and a horizontal section taken immediately under the said upper part of the supporting beam, and illustrate a modified embodiment of a certain detail as will be described hereinafter.

The load gear (see especially Fig. 4) comprises a shiftable fulcrum 1 and an operatively associated reversing lever 2 for transmitting brake power from a brake power source, represented by a brake cylinder 3, to a couple of equalizing brake levers 4, 5 for distributing the brake power to the two ends of the vehicle. The lever 4 has one end connected to the push rod of the brake cylinder by the intermediary of the reversing lever 2 and is called the cylinder lever, and the lever 5 has its corresponding end attached to a stationary fulcrum point 16, and at a point between its ends to a corresponding point of the cylinder lever by a rod 6, and is called the floating lever. To the other ends of the levers 4 and 5 are connected pull rods 7 and 8 extending to brake members provided in the usual manner at either end of the vehicle for coaction with the vehicle wheels or axles, but not shown in the drawings. The reversing lever 2 is linked at one of its ends directly to the projecting end of the push rod 9 of the brake cylinder. The cylinder lever 4 is linked to the other end of the reversing lever 2 by means of a link rod 10.

As a support for the load gear comprising the shiftable fulcrum 1 and the reversing lever 2 coacting therewith, a beam is provided that is extended from the load gear towards both ends of the vehicle. In the embodiment illustrated by way of example in the drawings the said beam comprises two longitudinal parts, an upper part 11 and a lower part 12, which are preferably of sheet metal and of U-like cross section and arranged with their flanges extending inwards, as may be seen from Figs. 6–9. Between the longitudinal upper and lower beam parts 11 and 12 respectively are welded or otherwise fastened a pair of transverse partitions 13 and 14, which together with the longitudinal upper and lower beam parts 11 and 12 define a transverse space 15 extending from one side of the supporting beam to the other. The shiftable fulcrum 1 and the reversing lever 2 are disposed in said space 15. On that extension of the supporting beam 11, 12 extending from the space 15 towards the one end of the vehicle, the supporting beam 11, 12 carries the brake cylinder 3, and on the other extension, extending from the space 15 towards the other end of the vehicle, the beam 11, 12, carries the stationary fulcrum to which the floating lever 5 is attached by its pivot pin 16. The brake cylinder 3 is mounted on the beam 11, 12 by means of a pair of brackets 17, 18 provided on the upper and the lower side of the beam, as shown in Figs. 2 and 6. The stationary fulcrum 19 for the floating lever 5 forms part of a horizontal plate 20 projecting from the appropriate side of the beam 11, 12 and secured thereto in the horizontal median plane thereof (Figs. 3, 4 and 7). The plate 20 is mounted between a couple of transverse partitions 21, fitted between the upper and lower parts 11 and 12, respectively, of the supporting beam and converging in the direction towards the pin of the pivot 16, said converging partitions limiting the play or swing of the floating lever 5 about the stationary pivot pin 16. As aforesaid, the plate 20 forming the fulcrum e. g. for the floating lever 5 extends in the horizontal median plane of the supporting beam 11, 12. All the levers 2, 4 and 5 are disposed between the upper and lower parts 11, 12 of the supporting beam 11, 12 and substantially in the said horizontal median plane thereof, and thus the transmission of the brake power from the brake cylinder through all the levers 2, 4 and 5 takes place in this plane with respect to which the supporting beam is substantially symmetrical. To support the cylinder lever 4 there is provided on the lower part 12 of the supporting beam adjacent the side thereof carrying the brake cylinder 3 a suitable guide 22 (Figs. 4 and 9), on which the lever 4 slides when actuated. The partition 14 is provided on that side facing the brake cylinder with an elongated guide 23 (Fig. 4) for the shiftable fulcrum 1, which guide extends beyond the side of the beam on which the brake cylinder is mounted. The construction of both the shiftable fulcrum 1 and its guide 23 may vary considerably, as may also the construction of the reversing lever 2 and its operatively associated elements and may furthermore be such as are known per se, for which reason these elements need not be described or shown in detail. The space 15 between the beam parts 11, 12 is closed, and the ends of the reversing lever 2 encased on either side of the supporting beam by means of cases 24, 25 which are so dimensioned as to admit of free movement of the reversing lever 2. The case 24 located on the same side of the beam as the brake cylinder 3, is connected to the latter, and the case 25 on the other side of the supporting beam is provided with a packing 26 (Fig. 4) shown only diagrammatically in the drawings, at the opening provided for the link rod 10, so that the load gear is tightly encased, and consequently well protected against the intrusion of water, dirt or any other undesired foreign matter.

The shifting of the position of the shiftable fulcrum 1 along its guide 23 may be effected by already known means either manually or automatically according to the load of the vehicle. To achieve an automatic shifting of the position of the shiftable fulcrum for the reversing lever it has already been proposed to connect this fulcrum to a spring device, the deflection of which is at all times proportional to the load of the vehicle at any given moment. According to the invention the supporting beam 11, 12, carrying the load gear, the brake cylinder and the stationary fulcrum for the floating lever, may advantageously carry also the said spring device and the connection means between the latter and the shiftable fulcrum 1 for the reversing lever 2. In this case the spring device is suitably mounted in that extension of the supporting beam 11, 12 carrying the brake cylinder 3, especially in case the spring device consists of a semielliptical spring as shown at 27 that is stretched by a pull, the order of which is proportionate to the vehicle load, and to which spring the shiftable fulcrum 1 is connected in such a way, that the position of the shiftable fulcrum is shifted by the deflection of the spring transversely to the direction of stretching of the latter. In accordance with the embodiment illustrated in the drawings the extension of the beam carrying the brake cylinder 3 is made sufficiently long, i. e. extended an adequate length beyond the cylinder 3, so that the whole of the semielliptical spring 27 extending substantially longitudinally of the vehicle may be received between the upper and lower parts of the supporting beam 11, 12. This spring 27 is guided at both its ends by bifurcated guide members 28, 29, of which one is fastened to the transverse partition 13, and the other to a transverse plate 30 attached between the two beam parts 11 and 12 at the free end of the beam extension. To the ends of the leaf spring 27, guided by the guide members 28 and 29, are linked pull rods 31, 32 which are longitudinally guided in the supporting beam and project from the respective ends of the latter. These pull rods 31, 32 are connected by means of links 33, 34 to lever systems 35, 36 (Fig. 1) which transmit to the rods 33 and 34 forces or pulls derived from the supporting spring pressures at the respective ends of the vehicle. These forces vary according to the portions of the vehicle load supported by the supporting springs at the respective ends of the vehicle. The leaf spring 27 is longitudinally stretched by said pulls, and the arrangement is so devised, in a manner known per se, that the amount of stretching and deflection of the spring 27 is determined by the supporting spring pressure at that end of the vehicle carrying the smaller portion of the vehicle load. The outward movement of the ends of the spring 27 is limited by the guide members 28, 29. If the pull exercised by the rod 31 exceeds that of rod 32, that end of the leaf spring 27 guided by the bifurcated guide 28 will engage the bottom of the latter, so that the smaller pull of the rod 32 will determine the deflection of the spring 27. If, however, the pull of the rod 32 exceeds that of the rod 31, that end of the spring 27 guided by the bifurcated guide 29 will engage the bottom of the latter, so that the smaller pull of the rod 31 will determine the deflection of the spring 27. Hereby, as already known per se, the position of the shiftable fulcrum 1 for the reversing lever 2, and thus the brake applying leverage of the brake system, will always be determined by the supporting spring pressure at the least loaded end of the vehicle. The force actuating the shiftable fulcrum 1 is derived from the deflection of the spring 27 transversely to its direction of stretching. The device necessary for this actuation of the shiftable fulcrum 1 may vary considerably, and according to the illustrated embodiment it comprises a double armed lever 37 located within the supporting beam 11, 12, which lever 37 is pivoted at 38 and is provided at one of its ends with a member 39 embracing the spring intermediate the ends of the latter. The other end of the lever 37 is connected with the shiftable fulcrum 1 by means of a link 40. The lever 37 extends through an opening, arranged therefor in the transverse partition 13. The space in the supporting beam containing the lever 37 and the spring 27 is bordered on both sides by cover plates 42 (Figs. 6 and 8). In order to enable or to facilitate a ready adjustment of the device for transmitting the movement of the spring 27 to the shiftable fulcrum 1, it may be advantageous to adjustably attach the pivot pin 38 for the lever 37 to the supporting beam, as illustrated in Figs. 10 and 11, wherein the pivot pin 38 is located in a bifurcated mounting 43, which by means of slots 44 and bolts 45 is fastened to the underneath side of the upper part of the beam, so that it may be adjusted transversely thereon.

It will be apparent from the above description that the supporting beam 11, 12, together with all those elements carried by the same may be mounted as a standardized constructional unit or unitary equipment immediately underneath the ordinary transverse sills 46 of the under-frame of the vehicle, practically speaking, independent of any variation in the relative disposition of said sills. This fact, as well as the possibility of carrying out in the machine workshop the actual making, adjustment, trial tests and strength tests of all the parts before they are assembled and mounted as a constructional unit or unitary equipment on the sills of the under-frame of the vehicle represents a great advantage contributing to the standardization and rationalization of such equipments and the manufacture thereof. The car workshops are relieved from above mentioned work, so unsuitable for such places, and need only perform the comparatively simple mounting of the equipment, consisting in fastening the supporting beam 11, 12 to the transverse sills 46 of the under-frame of the car, attaching the lever systems 35, 36, and coupling the pull rods 31, 32 to the latter by means of the coupling rods 33, 34, mounting the brake elements at the respective ends of the vehicle, and coupling said elements to the equalizing levers 4, 5 by means of the main pull rods 7, 8. The stresses arising between the elements disposed between the supporting beam parts 11, 12 and partaking in the transmission of the braking force, are received completely by the supporting beam 11, 12, and are not transmitted to any part of the under-frame of the car and therefore do not necessitate any special bracing of the under-frame and need not be considered when constructing or designing the latter. The braking stresses to which the supporting beam 11, 12 may be subjected, act substantially in the horizontal median plane of the latter, so that the strains on the beam 11, 12 arising from these stresses are distributed in a most favourable way, which admits of a comparatively delicate and light construction of the supporting beam 11, 12.

In case the floating lever is fulcrumed not at the end corresponding to that of the cylinder lever receiving the braking force from the brake cylinder, but at its relatively opposite end, the fulcrum for the floating lever may suitably project from the same side of the beam 11, 12 as that on which the brake cylinder is mounted.

What I claim and desire to secure by Letters Patent is:

1. In a vehicle brake of the character described having a brake cylinder, coupled cylinder and floating brake levers for distributing the braking force of the brake cylinder to the opposite ends of the vehicle, a stationary fulcrum for the floating lever, and a load gear for varying the brake applying leverage of the brake, comprising a reversing lever for transmitting the braking force of the brake cylinder to the cylinder lever, and a shiftable fulcrum for the reversing lever, a beam carrying the load gear and being extended therefrom towards both ends of the vehicle and carrying on one of its extensions the brake cylinder and on the other extension the stationary fulcrum for the floating lever, the beam, the brake cylinder, the load gear and the stationary fulcrum for the floating lever forming together a unitary equipment mounted in place on the vehicle by the beam being attached longitudinally of the vehicle on the underneath side of the under-frame thereof.

2. In a vehicle brake of the character described and having a brake cylinder and coupled cylinder and floating brake levers for distributing the braking force to the opposite ends of the vehicle, a load gear for varying the brake applying leverage of the brake, comprising a reversing lever for transmitting the braking force of the brake cylinder to the cylinder lever, and a shiftable fulcrum for the reversing lever, a stationary fulcrum for the floating lever, and a straight beam carrying the load gear and being extended in opposite directions therefrom and carrying on one of its extensions the brake cylinder and on the other extension the stationary fulcrum for the floating lever, the beam, the brake cylinder, the load gear and the stationary fulcrum for the floating lever forming together a constructional unit adapted to be mounted in place on the vehicle by fastening the beam longitudinally of the vehicle onto the underneath side of the under-frame thereof.

3. In a vehicle brake as claimed in claim 2, the additional feature that the brake cylinder is mounted on one side of the beam and that the stationary fulcrum for the floating lever projects from the other side of said beam.

4. In a vehicle brake having coupled cylinder and floating brake levers for distributing a braking force to the opposite ends of the vehicle, a brake cylinder for producing the braking force, a load gear for varying the brake applying leverage of the brake, comprising a reversing lever for transmitting the braking force of the brake cylinder to the cylinder lever, and a shiftable fulcrum for the reversing lever, a stationary fulcrum for the floating lever, a beam comprising parallel upper and lower longitudinal parts with spaces therebetween for the reversing lever and the cylinder and floating levers, so that all these levers when in place, extend transversely through the beam substantially in the horizontal median plane thereof, said beam carrying the load gear and being extended in opposite directions therefrom and having attached to it on one of its extensions the brake cylinder and on the other extension the stationary fulcrum for the floating lever, said beam, the load gear, the brake cylinder and the stationary fulcrum for the floating lever forming together a constructional unit adapted to be mounted in place on the vehicle by fastening the beam longitudinally of the vehicle onto the underneath side of the under-frame thereof.

5. In a vehicle brake as claimed in claim 4, the additional features that the space for the reversing lever between the upper and lower longitudinal beam parts is bordered by transverse partitions extending between the upper and lower beam parts, and that a guide for the shiftable fulcrum for the reversing lever is provided on one of these partitions and extends horizontally and transversely of the beam beyond the side thereof on which the brake cylinder is attached.

6. In a vehicle brake of the character described, having a brake cylinder, coupled cylinder and floating brake levers for distributing the braking force of the brake cylinder to the opposite ends of the vehicle, a stationary fulcrum for the floating lever, a load gear for varying the brake applying leverage of the brake automatically according to the load of the vehicle, comprising a reversing lever for transmitting the braking force of the brake cylinder to the cylinder lever, a shiftable fulcrum for the reversing lever, a spring device associated with the shiftable fulcrum for determining the position thereof, and means for loading said spring device proportionately to the load of the vehicle, a beam carrying the load gear and being extended therefrom towards both ends of the vehicle and carrying on one of its extensions the brake cylinder and said spring device and on the other extension the stationary fulcrum for the floating lever, said beam, the brake cylinder, the load gear, said spring device and the stationary fulcrum for the floating lever forming together a unitary equipment mounted in place on the vehicle by the beam being attached longitudinally of the vehicle on the underneath side of the under-frame thereof.

7. In a vehicle brake having coupled cylinder and floating levers for distributing a braking force to the opposite ends of the vehicle, and means for deriving from vehicle supporting spring pressures a force substantially proportionate to the load of the vehicle, a brake cylinder for producing the braking force, a stationary fulcrum for the floating lever, a load gear for varying the brake applying leverage of the brake, comprising a reversing lever for transmitting the braking force of the brake cylinder to the cylinder lever, and a shiftable fulcrum for the reversing lever, a spring device adapted to be connected to the means deriving the force proportionate to the vehicle load and to be deflected by this force, means operatively associating the shiftable fulcrum with the spring device for shifting the position of the shiftable fulcrum according to the deflection of the spring device, and a straight beam carrying the load gear and being extended in opposite directions therefrom and carrying on one of its extensions the brake cylinder and on the other extension the stationary fulcrum for the floating lever and also carrying the spring device and the means for determining the position of the shiftable fulcrum according to the deflection of the spring device, said beam and all said parts and means carried thereby forming together a constructional unit adapted to be mounted in place on the vehicle by fastening the beam longitudinally of the vehicle onto the underneath side of the under-frame thereof.

8. In a vehicle brake as claimed in claim 7, the additional features that the beam comprises upper and lower longitudinally extending spaced parts and transverse partitions securely connecting the upper and lower beam parts to each other, and that the load gear and the spring device are disposed in spaces bordered by the beam parts, the space for the spring device being located in the beam extension carrying the brake cylinder, further spaces for receiving the cylinder and floating levers being provided between the upper and lower parts in the other extension of the beam.

9. In a vehicle brake having coupled cylinder and floating brake levers for distributing a braking force to the opposite ends of the vehicle, a beam adapted to be mounted in place on the vehicle by fastening the beam longitudinally of the vehicle onto the underneath side of the under-frame thereof and comprising substantially parallel upper and lower longitudinal parts and transverse partitions spacing the longitudinal upper and lower parts from, and attaching them to, each other, a brake cylinder for producing the braking force, attached to said beam on one side thereof, a load gear comprising a reversing lever for transmitting the braking force of the brake cylinder to the cylinder lever, disposed transversely of the beam substantially in the horizontal median plane thereof and in a space formed between the upper and lower longitudinal beam parts and walled by a pair of the transverse partitions, a shiftable fulcrum for the reversing lever, a guide for the shiftable fulcrum, provided on one of the last mentioned transverse partitions and extending horizontally and transversely of the beam, the beam being extended in opposite directions from the load gear and forming an elongated space between its upper and lower longitudinal parts in the one of its extensions projecting towards and beyond the brake cylinder, a semi-elliptical spring disposed substantially longitudinally of the beam in the last mentioned space, pull rods disposed substantially longitudinally of the beam and guided therein and projecting from the ends thereof and connected with the ends of the said spring and adapted to be connected to means for transmitting to them pulling forces derived from and proportionate to vehicle supporting spring pressures at the opposite ends of the vehicle, means disposed in the beam and operatively associating the shiftable fulcrum with the semi-elliptical spring so as to determine the position of the shiftable fulcrum by the transverse deflection of the semi-elliptical spring when loaded by said pulling forces, and a stationary fulcrum for the floating lever, disposed substantially in the horizontal median plane of the beam end attached thereto at the other extension thereof.

10. In a vehicle brake as claimed in claim 9, the additional feature that the space for the reversing lever is closed, and the ends of the latter encased on either side of the beam by cases dimensioned so as to admit of free motion of the reversing lever.

11. In a vehicle brake as claimed in claim 9, the additional feature that the space for the semi-elliptical spring is closed on either side of the beam by cover plates.

12. In a vehicle brake as claimed in claim 9, the additional feature that the means operatively associating the shiftable fulcrum for the reversing lever with the semi-elliptical spring comprises a lever pivoted at a point between its ends and having one end engaged with the spring at a point between the ends thereof, said lever being housed within the beam and having its other end projecting into the space for the reversing lever and connecting to the shiftable fulcrum therefor.

13. In a vehicle brake as claimed in claim 9, the additional feature that the fulcrum for the floating lever comprises a projecting end of a horizontal plate attached in the space between the upper and lower longitudinal parts of the beam to a pair of the transverse partitions thereof.

14. In a vehicle brake as claimed in claim 9, the additional feature that the means operatively associating the shiftable fulcrum for the reversing lever with the semi-elliptical spring comprises means for adjusting the position of the shiftable fulcrum in relation to a given deflectional position of the semi-elliptical spring.

BERT HENRY BROWALL.